United States Patent
Forster-Forson et al.

(10) Patent No.: US 12,224,541 B2
(45) Date of Patent: Feb. 11, 2025

(54) STRUCTURE FOR FASTENING VERIFICATION

(71) Applicant: INTERNATIONAL BUSINESS MACHINES CORPORATION, Armonk, NY (US)

(72) Inventors: Baaba Kyerewaa Forster-Forson, Woolwich Township, NJ (US); Vivian Zhang Di Tore, Poughkeepsie, NY (US); Rasit Onur Topaloglu, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 17/303,789

(22) Filed: Jun. 8, 2021

(65) Prior Publication Data
US 2022/0389946 A1 Dec. 8, 2022

(51) Int. Cl.
*H01R 4/36* (2006.01)
(52) U.S. Cl.
CPC ............ *H01R 4/36* (2013.01); *F16B 2200/93* (2023.08); *F16B 2200/95* (2023.08); *Y10T 403/20* (2015.01)
(58) Field of Classification Search
CPC .............. F16B 2200/93; F16B 2200/95; F16B 2200/99; F16B 31/02; F16B 31/024; Y10T 403/20; H01R 4/36; F16M 7/00; H05K 7/18; H05K 7/183; H05K 7/186; G06F 1/1601; G06F 1/181
USPC ................................................ 411/8, 9, 14.5
See application file for complete search history.

(56) References Cited

U.S. PATENT DOCUMENTS

| | | | |
|---|---|---|---|
| 3,710,307 A | | 1/1973 | Jus |
| 5,540,339 A | * | 7/1996 | Lerman ................. E05D 15/502 |
| | | | 312/324 |
| 6,024,330 A | * | 2/2000 | Mroz ....................... F16M 7/00 |
| | | | 248/188.4 |
| 7,412,898 B1 | | 8/2008 | Smith |
| 7,413,487 B1 | * | 8/2008 | Chen ....................... H01R 9/26 |
| | | | 439/817 |

(Continued)

FOREIGN PATENT DOCUMENTS

| | | | | |
|---|---|---|---|---|
| CA | 2924523 C | | 1/2019 | |
| DE | 102014112230 A1 | * | 3/2016 | ........... E05B 1/0015 |

(Continued)

OTHER PUBLICATIONS

Wikipedia, "Solar-powered calculator", https://en.wikipedia.org/wiki/Solar-powered_calculator#:~:text=Solar cal . . . , accessed Mar. 11, 2021, pp. 1-2.

*Primary Examiner* — Amber R Anderson
*Assistant Examiner* — Kevin J Baynes
(74) *Attorney, Agent, or Firm* — Tihon Poltavets

(57) ABSTRACT

An apparatus for a fastening verification structure includes a fastener disposed in a cavity, where a leading end of the fastener is configured to press a non-insulated contact pad. The first end of a first lead electrically coupled to the fastener and a second end of the first lead electrically coupled to a power source. The first end of a second lead electrically coupled to the non-insulated contact pad and a second end of the second lead electrically coupled to a visual indicator. The first end of a third lead electrically coupled to the visual indicator and a second end of the third lead electrically coupled to the power source.

12 Claims, 5 Drawing Sheets

(56) References Cited

U.S. PATENT DOCUMENTS

| | | | |
|---|---|---|---|
| 7,731,545 B1* | 6/2010 | Scholeno | H01R 33/05 |
| | | | 439/619 |
| 10,406,659 B2 | 9/2019 | Dicaire | |
| 10,690,487 B2 | 6/2020 | Crowther | |
| 10,771,004 B2 | 9/2020 | Woyciesjes | |
| 11,043,762 B1* | 6/2021 | Kalliche | H01R 12/515 |
| 2005/0000465 A1 | 1/2005 | Wescombe-Down | |
| 2014/0267797 A1 | 9/2014 | Clarke | |
| 2017/0320197 A1 | 11/2017 | Dicaire | |
| 2019/0386600 A1 | 12/2019 | Woyciesjes | |
| 2023/0139352 A1* | 5/2023 | Broadfield | G01D 5/145 |
| | | | 411/337 |
| 2023/0213049 A1* | 7/2023 | Cho | B25B 23/005 |
| | | | 411/337 |

FOREIGN PATENT DOCUMENTS

| | | |
|---|---|---|
| EP | 2467711 B1 | 8/2017 |
| TW | 201316009 A | 4/2013 |

\* cited by examiner

STRUCTURE FOR FASTENING VERIFICATION

BACKGROUND

This disclosure relates generally to fasteners, and in particular, to a structure for fastening verification.

A fastener represents a hardware device that mechanically couples two or more objects, where the fastener is removable providing a non-permanent joint for the two or more objects. Fasteners can include bolts, lugs, nails, nuts, pins, screws, rivets, and other mechanical devices capable of mechanically coupling the two or more objects. A rack enclosure represents a frame structure for mounting various server equipment, where the rack enclosure typically includes lower mounted caster for maneuvering the rack enclosure to a desired location at a customer site. At the desired location, the rack enclosure is typically secured to a lockdown plate with fasteners to ensure the rack enclosure does not topple over in the event of an earthquake.

SUMMARY

An embodiment of the present invention discloses an apparatus for a fastening verification structure, the apparatus comprising a fastener disposed in a cavity, wherein a leading end of the fastener is configured to press a non-insulated contact pad. The apparatus further comprising a first end of a first lead electrically coupled to the fastener and a second end of the first lead electrically coupled to a power source. The apparatus further comprising a first end of a second lead electrically coupled to the non-insulated contact pad and a second end of the second lead electrically coupled to a visual indicator. The apparatus further comprising a first end of a third lead electrically coupled to the visual indicator and a second end of the third lead electrically coupled to the power source.

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which.

DETAILED DESCRIPTION

Figure 1:
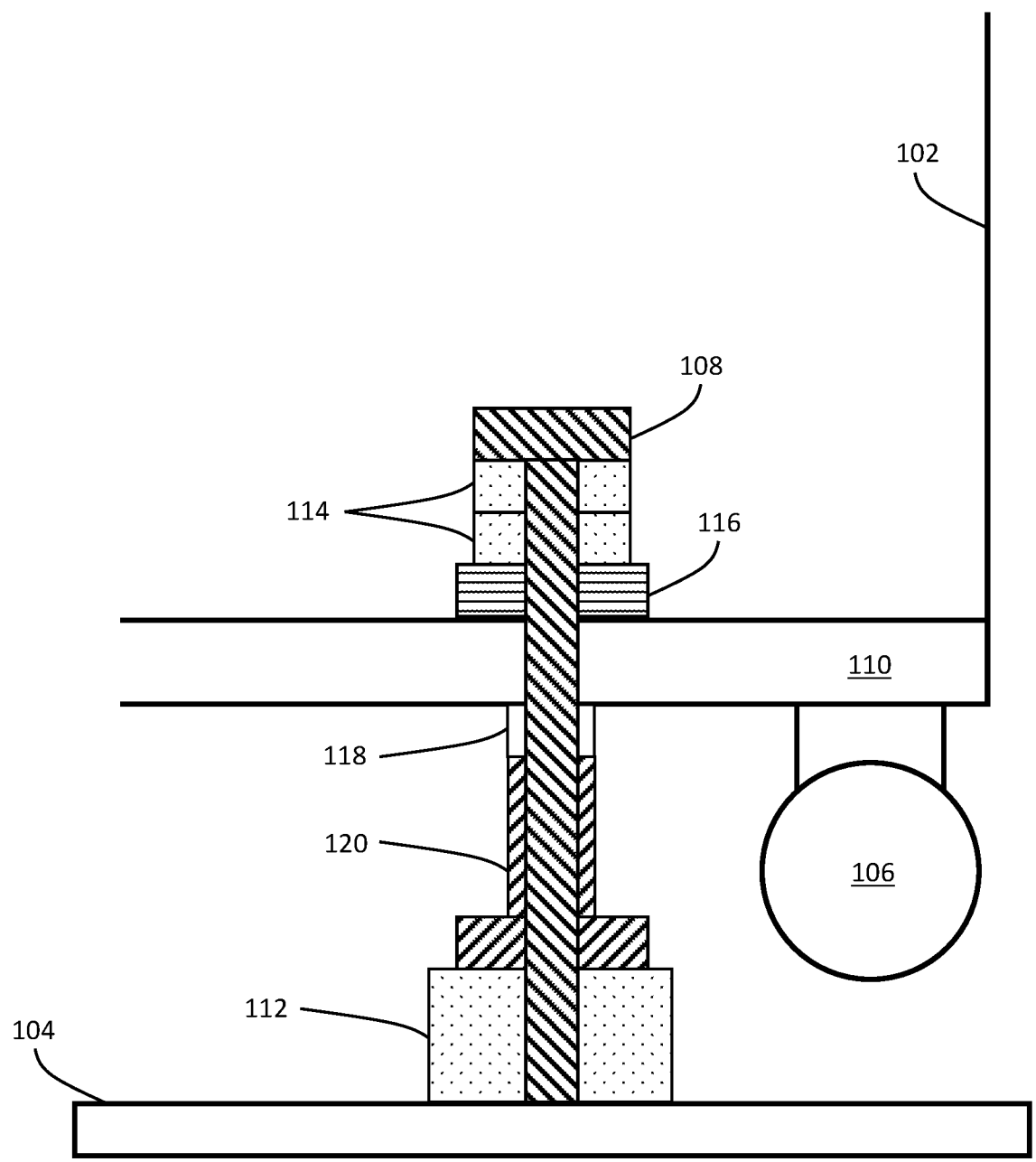
FIG. 1 depicts a side view of a secured corner of a rack enclosure, in accordance with an embodiment of the present invention.

Embodiments of the present invention provide a fastening verification structure that includes an upper insulated wire with an upper non-insulated contact pad positioned over a lower non-insulated contact pad of a lower insulated wire in a cavity. A fastener, such as, a bolt is disposed in the cavity above the upper insulated wire configured to press the upper non-insulated contact pad into the lower non-insulated contact pad, thus creating an electrical connection. The upper insulated wire and the lower insulated wire is coupled to a power source and a visual indicator, where the visual indicator is activated upon the upper non-insulated contact pad pressing into the lower non-insulated contact pad creating the electrical connection. In the embodiments discussed below, the fastener is utilized to properly secure a rack enclosure to a lockdown plate disposed on a concrete floor. However, the fastening verification structure is applicable to any embodiment requiring the utilization of a fastener to secure an object.

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle. It is to be noted, the term "wire" covers all shapes of a metal drawn out into the form of a flexible thread or strand and is not limited to a typical cylindrical shape. Furthermore, for discussion purposes, the term "wire" covers any physical medium capable of passing electrical current (e.g., trace).

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

FIG. 1 depicts a side view of a secured corner of a rack enclosure, in accordance with an embodiment of the present invention. Each corner of a four cornered rack enclosure 102 is typically secured to floor 104 in an elevated position, where caster 106 of rack enclosure 102 is disposed above floor 104. Bolt 108 is disposed in base 110 of rack enclosure 102 securing a corner of rack enclosure 102 to lockdown plate 112 disposed on floor 104, where floor 104 is typically concrete. In this embodiment, two washers 114 are disposed on spacer 116 with bolt 108 disposed through an aperture along a central axis of each washer 114 and spacer 116, where a head of bolt 108 presses washer 114 and spacer 116 against a top surface of base 110 of rack enclosure 102. Jam nut 118 is disposed on leveler 120 and leveler 120 is disposed on lockdown plate 112, where bolt 108 is disposed in an aperture along a central axis of each jam nut 118 and leveler 120. As bolt 108 secures rack enclosure 102 to lockdown plate 112 disposed on floor 104, a lower surface of base 110 presses against top surface of jam nut 118, a bottom surface of jam nut 118 presses against a top surface of leveler 120, and a bottom surfaces of leveler 120 presses against a top surface of lockdown plate 112. Bolt 108 is disposed in a cavity defined by the aperture of lockdown plate 112 and a top surface of floor 104. In some embodiments discussed below, bolt 108 is of a conductive material including but not limited to steel, aluminum, copper, brass, bronze, platinum, gold, silver, and graphite.

Not properly securing bolt or selecting an incorrect bolt and washer combination for securing base 110 of rack enclosure 102 to lockdown plate 112 disposed on floor 104, increases a risk of rack enclosure 102 toppling over during an earthquake event. If bolt 108 is not properly secured to lockdown plate 112, bolt 108 can loosen at one or more corners of rack enclosure 102 resulting in rack enclosure 102 toppling over and causing damage to electronic equipment installed on rack enclosure 102. Utilizing torque specification for securing bolt 108 to lockdown plate 112 can provide a false indication since bolt 108 might be partially seated within lockdown plate 112 if a thickness of washer 114 is oversized for securing base 110 of rack enclosure 102. To ensure base 110 of rack enclosure 102 is secured to lockdown plate 112, a threaded portion of bolt 108 should be seated in lockdown plate 112 to avoid the threaded portion of bolt 108 from shearing during the earthquake event.

Figure 2A:
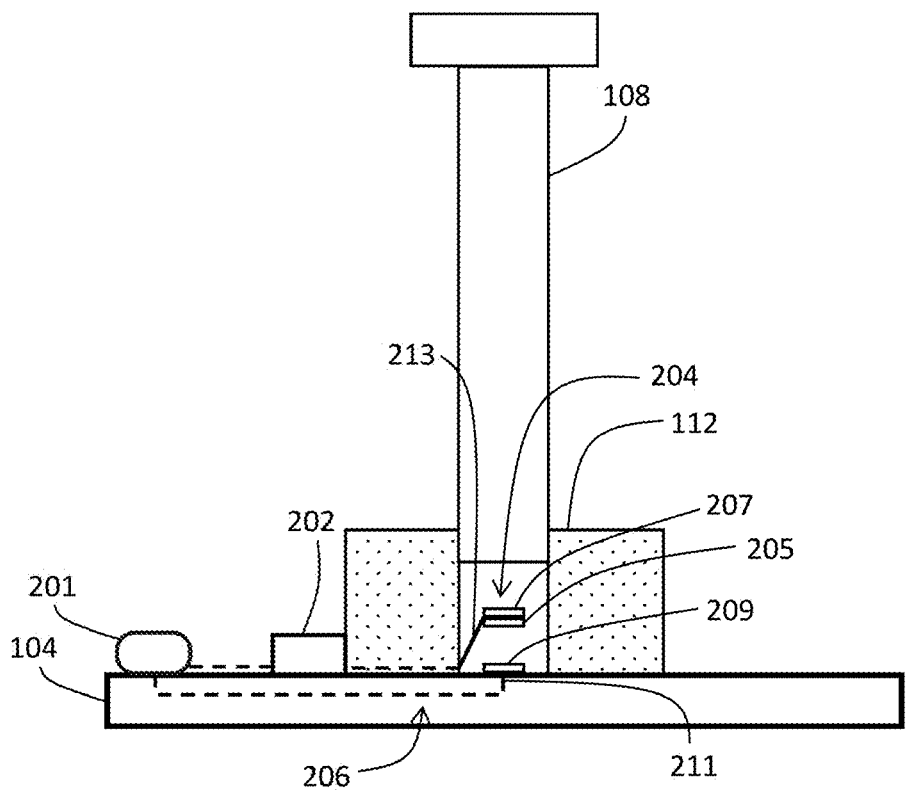
FIG. 2A depicts a side view of a fastening verification structure with a partially secured bolt, in accordance with an embodiment of the present invention.

FIG. 2A depicts a side view of a fastening verification structure with a partially secured bolt, in accordance with an embodiment of the present invention. For discussion purposes, bolt 108 represents a type of fastener and the embodiments discussed herein are applicable to all types of fasteners (e.g., nails, screws, rivets, clips, pins). To ensure bolt 108 is seated in lockdown plate 112 disposed on floor 104, a fastening verification structure is utilized that includes battery 202 electrically coupled to an upper insulated wire 204, a lower insulated wire 206, and visual indicator 201 (e.g., LED and/or display). Battery 202 can be one or more of an interchangeable primary cell, a rechargeable secondary cell, and/or a photovoltaic cell, capable of providing power to visual indicator 201. Upper non-insulated contact pad of lower portion 205 of upper insulated wire 204 is positioned opposite of lower non-insulated contact pad 209 of upper portion 211 of lower insulated wire 206. Upper non-insulated contact pad of lower portion 205 of upper insulated wire 204 is configured to contact lower non-insulated contact pad 209 of upper portion 211 of lower insulated wire 206 as a leading end of bolt 108 contacts upper portion 207 of insulated wire 204. Arm 213 of upper insulated wire 204 is spring loaded and configured to compress under the leading end of bolt 108 contacting upper portion 207 of upper insulated wire 204. The spring-loaded arm 213 is configured to hover upper non-insulated contact pad of lower portion 205 above lower non-insulated contact pad 209.

Upper portion 207 of upper insulated wire 204 is insulated so as not to transmit a current through bolt 108 upon contacting upper insulated wire 204. As bolt 108 is inserted into lockdown plate 112, upper non-insulated contact pad of lower portion 205 of upper insulated wire 204 contacts lower non-insulated contact pad 209 of upper portion 211 of lower insulated wire 206, creating an electrical connection to indicate that bolt 108 is properly seated into lockdown plate 112. Visual indicator 201 is activated with the electrical connection to indicate that bolt 108 is properly seated into lockdown plate 112 and remains activated until the electrical connection is interrupted. The electrical connection can be interrupted due to bolt 108 back out of lockdown plate 112 due to vibrations (e.g., earthquake), physical removal of bolt 108, tampering of bolt 108, and/or a failure of the fastening verification structure.

Figure 2B:
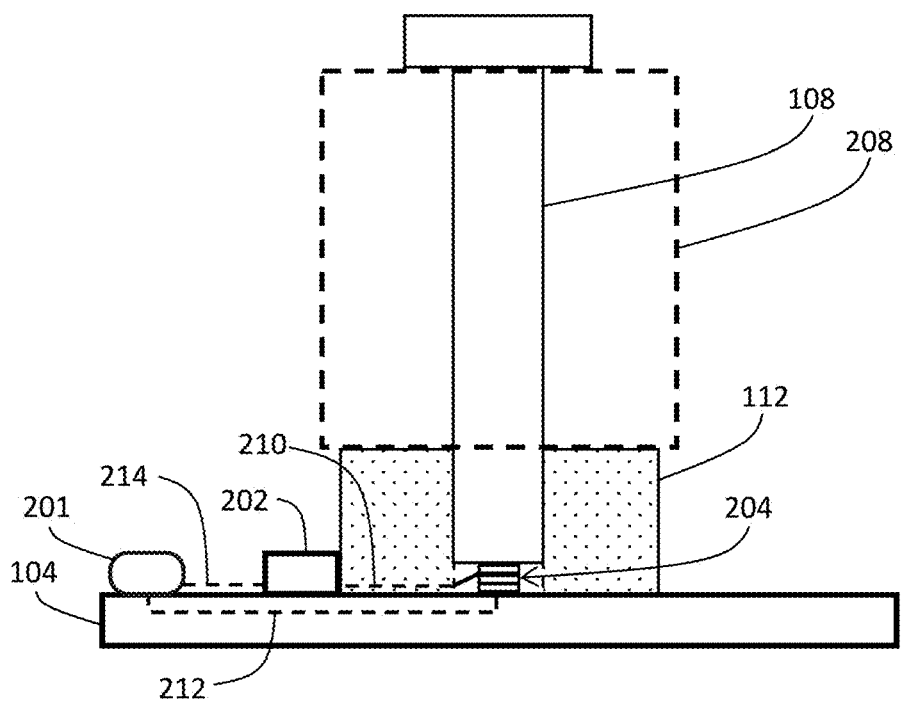
FIG. 2B depicts a side view of a fastening verification structure with a secured bolt, in accordance with an embodiment of the present invention.

FIG. 2B depicts a side view of a fastening verification structure with a secured bolt, in accordance with an embodiment of the present invention. Bolt 108 is seated in lockdown plate 112 disposed on floor 104 such that the upper non-insulated contact pad of the lower portion of upper insulated wire 204 contacts the lower non-insulated contact of the upper portion of lower insulated wire 206. Area 208 represents components positioned and pressed between lockdown plate 112 and the head of bolt 108. The components, though not illustrated in FIG. 2B are illustrated in FIG. 1, include washer 114, spacer 116, base 110 of rack enclosure 102, jam nut 118, and leveler 120. In this embodiment, a first end of first lead 210 is electrically coupled to upper insulated wire 204 and a first end of second lead 212 is electrically coupled to lower insulated wire 206, where first lead 210 and second lead 212 are flat wire positioned between lockdown plate 112 and floor 104. A second end of first lead 210 is electrically coupled to battery 202 and a second end of second lead 212 is electrically coupled to visual indicator 201, where a first end of third lead 214 is electrically coupled to battery 202 and a second end of third lead 214 is electrically coupled to visual indicator 201. Alternatively, a second end of first lead 210 is electrically coupled to visual indicator 201 and a second end of second lead 212 is electrically coupled to battery 202. In another embodiment, a first end of first lead 210 is electrically coupled to an upper wire (versus upper insulated wire 204) and a first end of second lead 212 is electrically coupled to a lower wire (versus lower insulated wire 206), where lockdown plate 112 includes a channel for each of first lead 210 and second lead 212 between lockdown plate 112 and floor 104, such that the upper wire and the lower wire do not contact lockdown plate 112.

Figure 3A:
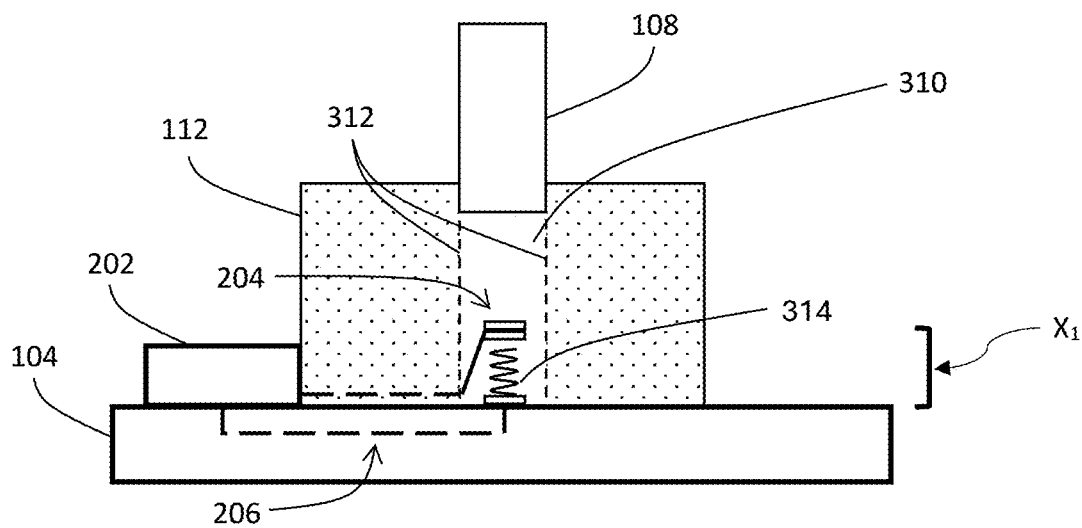
FIG. 3A depicts an enhanced side view of a fastening verification structure with a partially secured bolt, in accordance with an embodiment of the present invention.

FIG. 3A depicts an enhanced side view of a fastening verification structure with a partially secured bolt, in accordance with an embodiment of the present invention. In this enhanced view, bolt 108 is being inserted into aperture 310 of lockdown plate 112, where bolt 108 is threaded and side walls 312 of aperture 310 of lockdown plate 112 are threaded to accept bolt 108. An upper non-insulated contact pad of a lower portion of upper insulated wire 204 includes compressible member 314 to assist with establishing contact with a lower non-insulated contact pad of an upper portion of lower insulated wire 206. Compressible member 314 is of a conductive material and is coupled to the lower non-insulated contact pad of lower insulated wire 206 with one or more mounting methods including but not limited to a spot weld, a screw, adhesive, and a clamp. Compressible member 314 is conductive to allow for current to pass from battery 202 to lower insulated wire 206 to compressible member 314 and subsequent to contacting the upper non-insulated contact pad, the upper insulated wire 204. Furthermore, an arm of upper insulated wire 204 is spring loaded to allow for upper insulated wire 204 to bend towards compressible member 314 on lower non-insulated contact pad of the upper portion of lower insulated wire 206. The spring-loaded arm ensures that compressible member 314 breaks contact with the upper non-insulted contact pad of the lower portion of upper insulated wire 204, in the event bolt 108 backs out of lockdown plate 112. In some embodiments, compressible member is coupled to the upper non-insulated contact pad of upper insulated wired 204. Height $X_1$ represents the spring-loaded arm of insulated arm 213 in a non-compressed state and compressible member 314 in a non-compressed state.

Figure 3B:
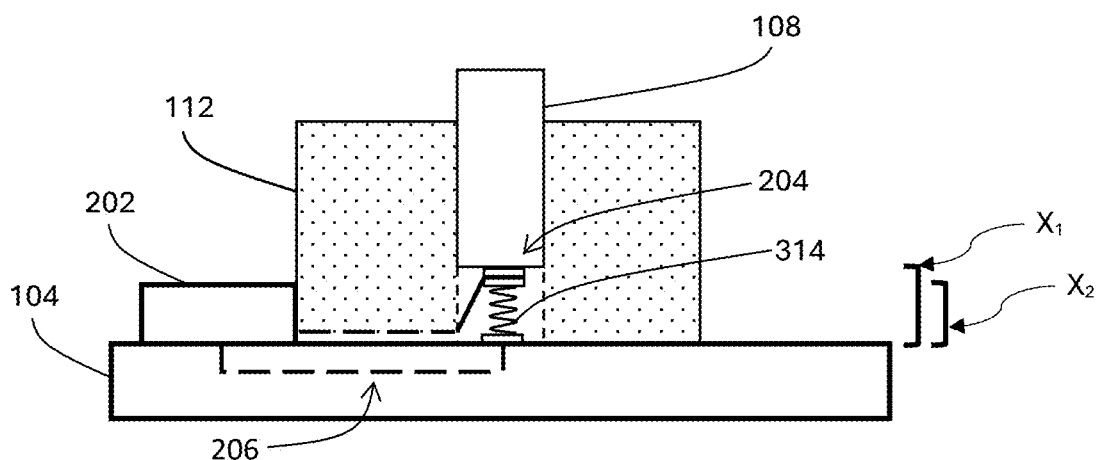
FIG. 3B depicts an enhanced side view of a fastening verification structure with a partially secured bolt contacting an insulated wire, in accordance with an embodiment of the present invention.

FIG. 3B depicts an enhanced side view of a fastening verification structure with a partially secured bolt contacting an insulated wire, in accordance with an embodiment of the present invention. In this enhanced view, the spring-loaded arm of upper insulated wire 204 is being compressed, allowing for compressible member 314 to contact the upper non-insulted contact pad of the lower portion of upper insulated wire 204. As bolt 108 is threaded further into lockdown plate 112, the upper non-insulated contact pad of the lower portion of upper insulated wire 204 is configured to contact the lower non-insulated contact of the upper portion of lower insulated wire 206 as a leading end of bolt 108 contacts upper insulated wire 204. The spring-loaded arm of upper insulated wire 204 compresses and the upper contact pad is pushed towards compressible member 314 on the lower non-insulted contact pad of the upper portion of lower insulated wire 206. Compressible member 314 accounts for small cavity presenting between bolt 108, lockdown plate 112, and floor 104, to ensure an electrical connection is formed between upper insulated wire 204 and lower insulated wire 206. Height $X_2$ represents the spring-loaded arm of insulated arm 213 in a partially compressed state and compressible member 314 in a partially compressed state, where the electrical connection is initially established.

Figure 3C:
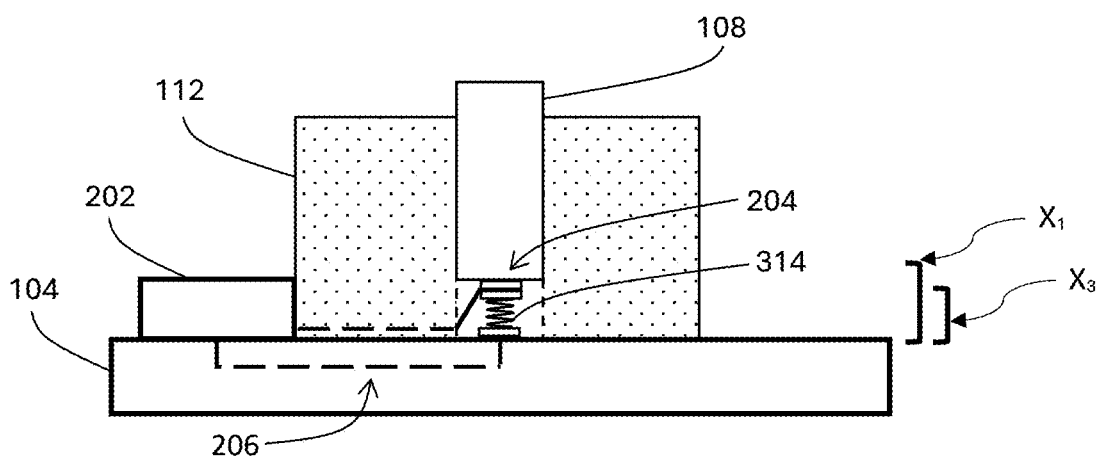
FIG. 3C depicts an enhanced side view of a fastening verification structure with a secured bolt, in accordance with an embodiment of the present invention.

FIG. 3C depicts an enhanced side view of a fastening verification structure with a secured bolt, in accordance with an embodiment of the present invention. In this enhanced view, the spring-loaded arm of upper insulated wire 204 is being further compressed as bolt 108 is being torqued down, allowing for compressible member 314 to maintain contact with the upper non-insulted contact pad of the lower portion of upper insulated wire 204. As bolt 108 is threaded further into lockdown plate 112, the upper non-insulated contact pad of the lower portion of upper insulated wire 204 is configured to press further into the lower non-insulated contact of the upper portion of lower insulated wire 206 as a leading end of bolt 108 contacts upper insulated wire 204. The spring-loaded arm of upper insulated wire 204 further compresses and compressible member 314 is further compressed on the upper non-insulted contact pad of the lower portion of upper insulated wire 204. Thus, resulting in a more robust electrical connection between upper insulated wire 204, compressible member 314, and lower insulated wire 206. Height $X_3$ represents the spring-loaded arm of insulated arm 213 in a final compressed state and compressible member 314 in a final compressed state with the established electrical connection.

Figure 4:
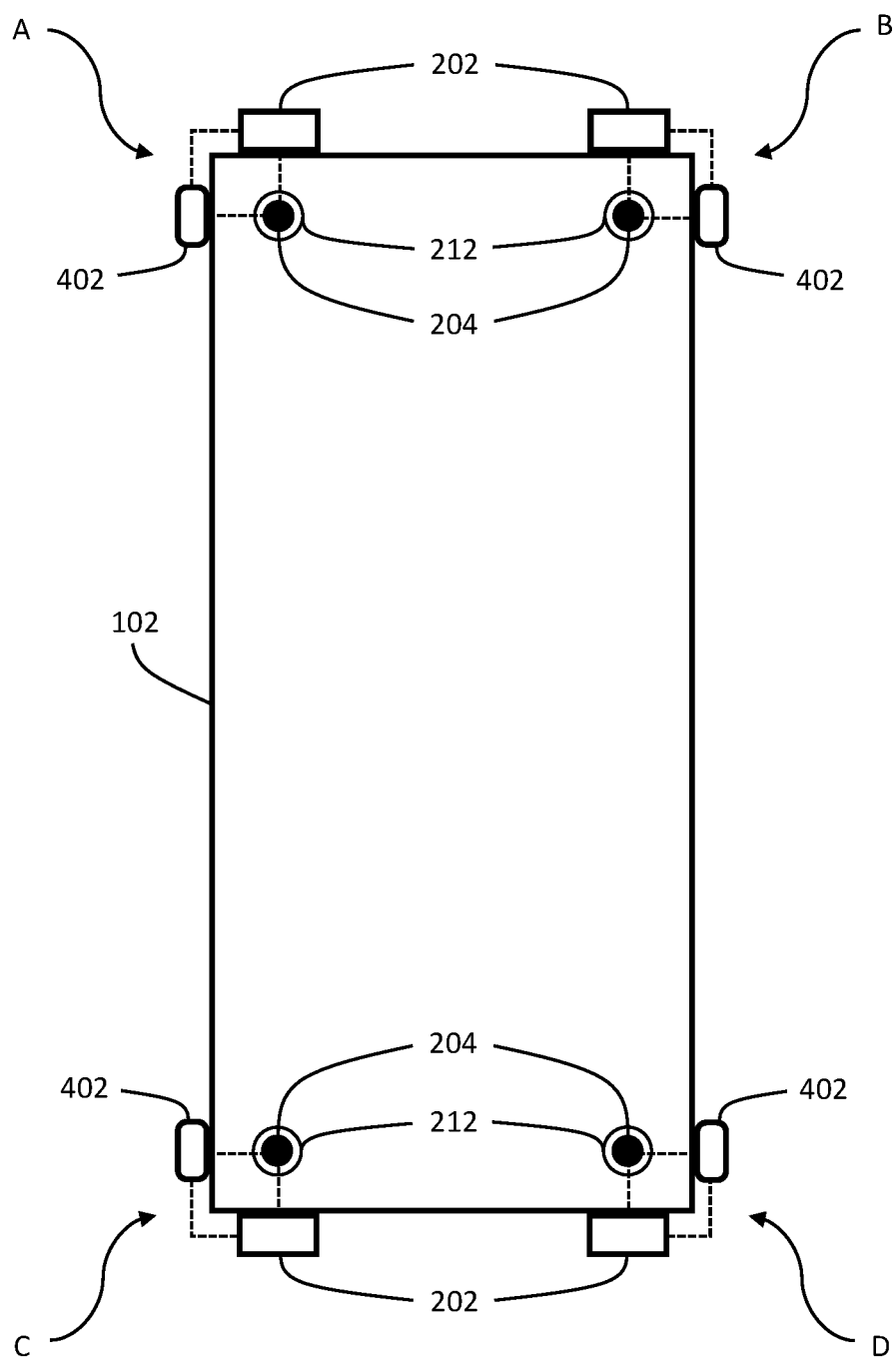
FIG. 4 depicts an overhead view of a fastening verification structure positioned at each corner of a rack enclosure, in accordance with an embodiment of the present invention.

FIG. 4 depicts an overhead view of a fastening verification structure positioned at each corner of a rack enclosure, in accordance with an embodiment of the present invention. In the overhead view, rack enclosure 102 include four fastening verification structures positioned at corner A, corner B, corner C, and corner D, where each fastening verification structure includes battery 202 electrically coupled to an upper insulated wire 204, lower insulated wire 206 (not illustrated in FIG. 4), and visual indicator 402. Visual indicator 402 can be one or more light-emitting diodes (LED) and/or an electronic display providing a visual indicator to a user regarding whether bolt 108 is properly secured to lockdown plate 112. In one embodiment, if bolt 108 is not properly secured to lockdown plate 112 and an electrical connection is not present between upper insulated wire 204 and lower insulated wire 206, visual indicator 402 will not illuminate since a current is not passing through upper insulated wire 204 and lower insulated wire 206. However, if bolt 108 is properly secured to lockdown plate 112 and an electrical connection is present between upper insulated wire 204 and lower insulated wire 206, visual indicator 402 illuminates (e.g., green LED) since a current is passing through upper insulated wire 204 and lower insulated wire 206. In another embodiment, visual indicator 402 is electrically coupled to battery 202, independent from the circuit between upper insulated wire 204 and lower insulated wire 206. As a result, visual indicator 402 receives constant power from battery 202 and determine whether current is passing between upper insulated wire 204 and lower insulated wire 206. Visual indicator 402 can display a status for bolt 108 through the electronic display and/or one or more uniquely color LEDs, each representing a different status.

Though in this embodiment a fastening verification structure is positioned at every corner of rack enclosure 102, in some embodiments two fastening verification structures can be utilized for rack enclosure 102. The two fastening verification structures can be positioned opposite and diagonal from one another to ensure optimal monitoring of bolts 108 securing rack enclosure 102 to lockdown plate 112. In one example, one fastening verification structure can be positioned at corner A and a second fastening verification structure can be positioned at corner D. In another example, one fastening verification structure can be positioned at corner B and a second fastening verification structure can be positioned at corner C.

Figure 5:
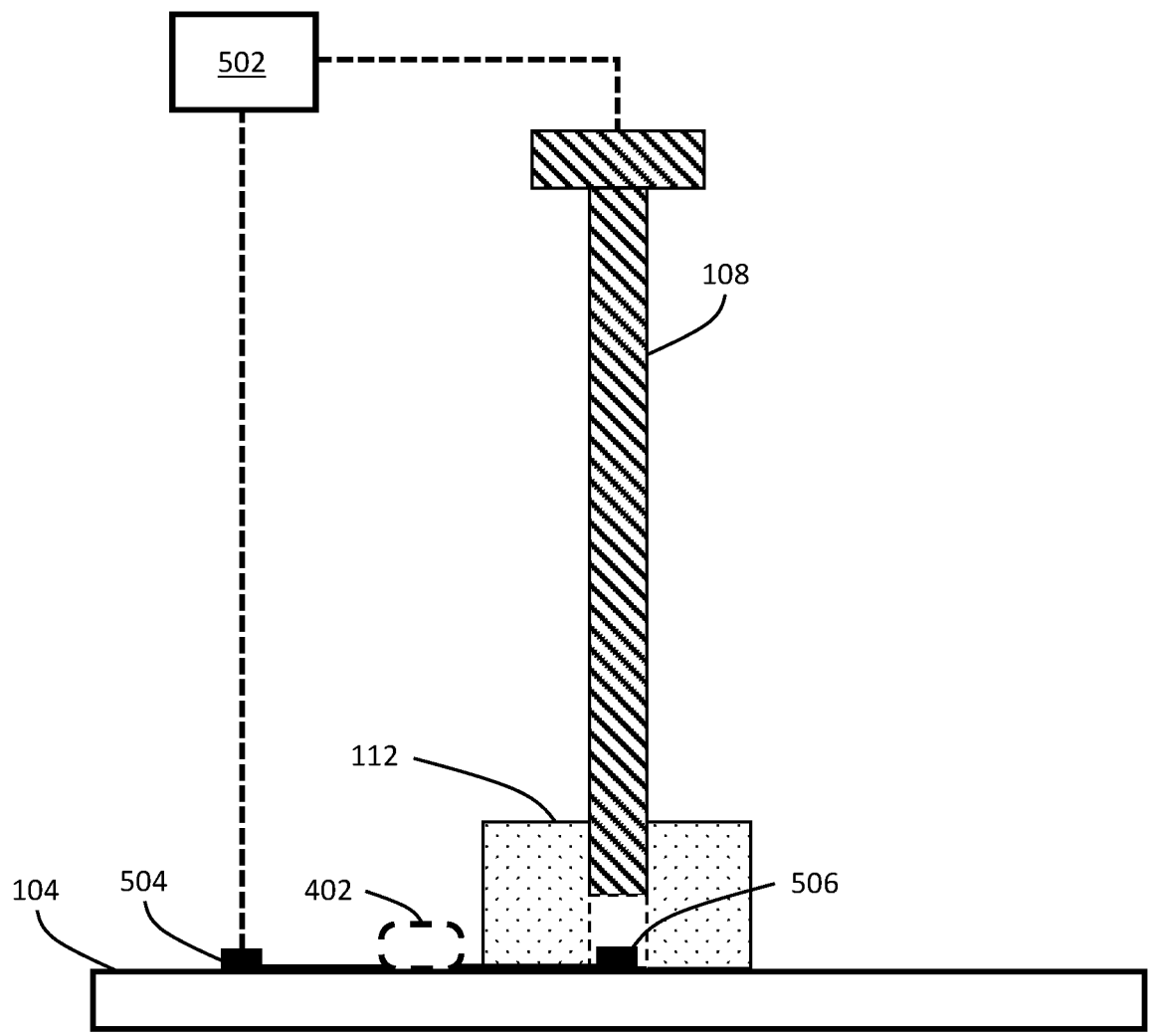
FIG. 5 depicts a side view of a fastening verification structure with a mobile power source, in accordance with an embodiment of the present invention.

FIG. 5 depicts a side view of a fastening verification structure with a mobile power source, in accordance with an embodiment of the present invention. In this embodiment, external power source 502 is utilized to verify whether bolt 108 is properly seated in lockdown plate 112 on floor 104. External power source 502 represents a handheld mobile device that a technician can temporarily electrically couple to the fastening verification structure and a provide a DC voltage source. A first lead electrically connects to bolt 108 and a second lead electrically connects to grounding pad 504, where grounding pad 504 is electrically coupled to visual indicator 402 and visual indicator 402 is electrically coupled to landing pad 506. Landing pad 506 represents a variation of a contact pad of lower insulated wire 206, where landing pad 506 represents the lower non-insulated contact pad of an upper portion of lower insulated wire 206. As bolt 108 is further inserted into lockdown plate 112, the leading end of bolt 108 contacts landing pad 506. As a result, when the first lead and the second lead are connected to external power source 502, visual indicator 402 receives a current and indicates to a user (e.g., green LED) that bolt 108 is properly seated in lockdown plate 112. This connection ensures that current applied to bolt 108 is not conducted away from the fastening verification structure as current flows through the path.

The terminology used herein is for the purpose of describing particular embodiments only and is not intended to be limiting to the invention. As used herein, the singular forms "a", "an" and "the" are intended to include the plural forms as well, unless the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims.

What is claimed is:

1. An apparatus comprising:
   a fastener disposed in a cavity of a lockdown plate, wherein a leading end of the fastener is directly pressed into a non-insulated contact pad positioned in the cavity of the lockdown plate which secures a rack enclosure to a floor;
   a first end of a first lead electrically coupled to the fastener and a second end of the first lead electrically coupled to a power source;
   a first end of a second lead electrically coupled to the non-insulated contact pad and a second end of the second lead electrically coupled to a visual indicator; and
   a first end of a third lead electrically coupled to the visual indicator and a second end of the third lead electrically coupled to the power source, wherein the visual indicator is configured to activate when the leading end of the fastener contacts the non-insulated contact pad, thereby providing indication that the rack enclosure is securely mounted to the lockdown plate in the floor.

2. The apparatus of claim 1, further comprising:
   a washer disposed on a spacer and the spacer disposed on a base of the rack enclosure, wherein the fastener is disposed in an aperture along a central axis for each of the washer, the spacer, and the base of the rack enclosure.

3. The apparatus of claim 2, further comprising:
   a jam nut disposed on a leveler and the leveler disposed on the lockdown plate, wherein the fastener is disposed in another aperture along the central axis for each of the jam nut, the leveler, and the lockdown plate.

4. The apparatus of claim 1, wherein the visual indicator is an LED.

5. The apparatus of claim 1, wherein the visual indicator is an electronic display.

6. An apparatus comprising:
   a fastener disposed in a cavity of a lockdown plate, wherein a leading end of the fastener is pressed into an upper portion of an upper insulated wire positioned in the cavity of the lockdown plate which secures a rack enclosure to a floor;
   a first end of a first lead electrically coupled to a lower portion of the upper insulated wire and a second end of the first lead electrically coupled to a power source;
   a first end of a second lead electrically coupled to an upper portion of a lower insulated wire and a second end of the second lead electrically coupled to a visual indicator; and
   a first end of a third lead electrically coupled to the power source and a second end of the third lead electrically coupled to the visual indicator, wherein the visual indicator is configured to activate when the leading end of the fastener contacts the upper portion of the upper insulated wire and the lower portion of the upper insulated wire is pressed into the upper portion of the lower insulated wire, thereby providing indication that the rack enclosure is securely mounted to the lockdown plate in the floor.

7. The apparatus of claim 6, wherein the visual indicator is an LED.

8. The apparatus of claim 6, wherein the visual indicator is an electronic display.

9. The apparatus of claim 6, wherein the first end of the first lead includes a spring-loaded arm that is configured to hover the upper insulated wire above a lower non-insulated contact pad that is electrically coupled the upper portion of the lower insulated wire.

10. The apparatus of claim 9, wherein the spring-loaded arm is configured to compress as the leading end of the fastener contacts the upper portion of the upper insulated wire.

11. The apparatus of claim 10, further comprising:
    a washer disposed on a spacer and the spacer disposed on a base of the rack enclosure, wherein the fastener is disposed in an aperture along a central axis for each of the washer, the spacer, and the base of the rack enclosure.

12. The apparatus of claim 11, further comprising:
    a jam nut disposed on a leveler and the leveler disposed on the lockdown plate, wherein the fastener is disposed in another aperture along the central axis for each of the jam nut, the leveler, and the lockdown plate.

* * * * *